Aug. 15, 1950   J. W. WOLFE   2,519,009
CONDENSER CONSTRUCTION FOR USE WITH TRANSFORMERS
Filed March 31, 1948
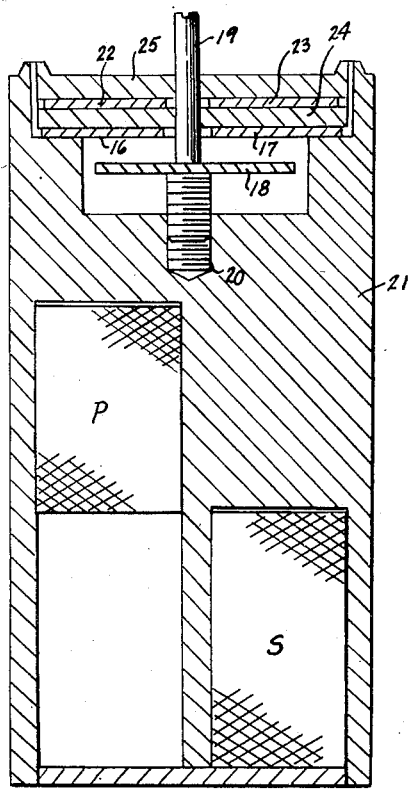
Fig. 1.
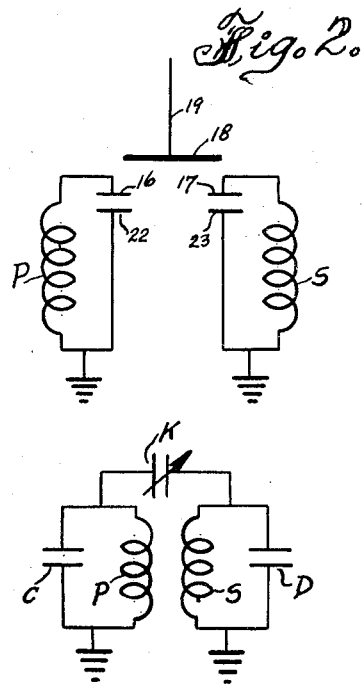
Fig. 2.
Fig. 3.
John W. Wolfe,
INVENTOR.
BY
ATTORNEY Patented Aug. 15, 1950

2,519,009

UNITED STATES PATENT OFFICE 2,519,009

CONDENSER CONSTRUCTION FOR USE WITH TRANSFORMERS

John W. Wolfe, Palisades Park, N. J., assignor to Super Electric Products Corp., Jersey City, N. J., a corporation of New Jersey Application March 31, 1948, Serial No. 18,238

4 Claims. (Cl. 178—44)

The present invention relates to radio and intermediate frequency transformers used in radio systems and particularly to condenser structures for use in connection with such transformers.

An object of this invention is to provide a novel and improved transformer of the character mentioned, utilizing condenser means of simple and compact structure to effect change in the mutual coupling of the transformer coils, by adjustment of capacitance only.

A further object of this invention is to so position the pair of condensers normally used in association with the coils of an intermediate frequency transformer, that with the addition of but a single component requiring no electrical connection, a third condenser is created, of the variable type, properly in circuit, and utilizing components of said pair of condensers to accomplish the existence of such third condenser.

Another object hereof is to materially decrease the amount of labor required to electrically connect three condensers in circuit with the coils of an intermediate frequency transformer, so that one condenser be in series electrical connection with the coils and intermediate them, and each of the coils have across them one of the condensers respectively, of the other two.

Another object of this invention is to provide a novel and improved intermediate frequency transformer and its associated condensers which are in circuit with its coils, which is of simple construction, reasonably cheap to manufacture, easy to use, and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a central longitudinal section through a device embodying the teachings of the present invention.

Fig. 2 is a diagram showing the manner in which the components of said device are electrically connected, shown in diagrammatic form.

Fig. 3 is a more formal electrical wiring diagram.

In the drawings, in Fig. 3, is indicated an intermediate frequency transformer having the coils P and S, across which coils respectively are the condensers C and D, with a variable condenser K electrically connected to and between the coils at high potential side. By means of this set up, total coupling between coils is varied by adjustment of capacitance only; the variable condenser K serving such function.

In the manufacture of such total units, it would ordinarily require three separate condensers to be electrically connected in the manner shown.

In the invention herein disclosed, applicant shows that he uses plate 16 of one of the condensers, and plate 17 of the other condenser, to constitute the plates of a variable condenser whose existence is created by having said plates 16 and 17 positioned spaced coplanar, opposite both of which is an auxiliary plate in the form of disc 18, moveable towards or away from them, or so moves that it present an area variable with respect to them. In the present embodiment, the former movement is used; said disc 18 being axially carried on a stem 19, in threaded engagement with socket 20 in a casing 21, which is of insulative material and houses the transformer coils P and S, and on which casing are mounted the condensers, as shown in Fig. 1. Plates 16 and 22 constitute one fixed condenser. Plates 17 and 23 comprise a second fixed condenser. Plates 16, 17 and the disc 18 make up the third, a variable condenser.

The plates 16, 17, 22 and 23 may be of metal foil, pasted, plated or otherwise deposited onto a dielectric disc or plate 24, positioned between the dielectric members 25 and 26.

The first mentioned fixed condenser may be deemed akin the condenser C, the second fixed condenser the condenser D, and the variable condenser made of parts 16, 17 and 18 the condenser K. If it is desired that condensers C and D be of the variable type, then their plates 16 and 17 shall be fixed so that condenser K shall be of the type shown.

In operation, the mutual coupling of the transformer coils is changed by adjustment of the variable capacitance K, or as is shown in Figs. 1 and 2, by manipulation of stem 19, which carries the plate 18.

This invention is capable of numerous forms and various applications without departing from the essential features herein disclosed. It is therefore desired and intended that the embodiment shown shall be deemed illustrative and not restrictive and that the patent shall cover all patentable novelty herein set forth; reference being had to the following claims rather than to the specific description herein to indicate the scope of this invention.

I claim:

1. In combination, a pair of electrical coils in inductive relation, a condenser electrically connected across one of said coils, a second condenser electrically connected across the other coil; each condenser including a pair of spaced electrically conductive members; one of the members of the first condenser and one of the members of the second condenser being positioned adjacent one another whereby capacitive effect between them is at a minimum and an electrically conductive plate exterior the condensers, moveably mounted in the region of said mentioned single members of the condensers and adapted when moved from one position to the other spaced and opposite both said single members, to create a variable condenser of which said single members constitute the electrically conductive members by the presence of said moveable plate; said plate being free of any electrical connection directly thereto; said variable condenser being between and in series electrical connection with said coils, automatically.

2. In combination, a pair of electrical coils in inductive relation, a condenser electrically connected across one of said coils, a second condenser electrically connected across the other coil; each condenser comprising a pair of spaced electrically conductive plate members, at least one of the plates of each of said condensers being fixed; said fixed plates being positioned whereby capacitive effect between them is at a minimum and an electrically conductive third plate exterior the condensers, moveably mounted in the region of said fixed plates and adapted when moved from one position to another spaced and opposite both said fixed plates to create a variable condenser of which said fixed plates of the first and second condensers constitute the plates of such variable condenser by the presence of said moveable plate; said moveable plate being free of any electrical connection directly thereto; said variable condenser being between and in electrical series connection with said coils, automatically.

3. An apparatus as defined in claim 2, wherein the mentioned fixed plates of the first and second condensers are in coplanar relation, the third plate is opposite each of said fixed plates constantly and said third plate is moveable towards or away from said fixed plates and the condensers.

4. In combination, a pair of electrical coils in inductive relation, a condenser electrically connected across one of said coils, a second condenser electrically connected across the other coil; each condenser comprising a pair of spaced electrically conductive plate members; at least one of the plates of each of said condensers being fixed adjacent one another, and means exterior the condensers, to alter the dielectric constant of the space between said fixed plates, whereby said fixed plates constitute a variable condenser between and in electrical series with said coils, automatically.

JOHN W. WOLFE.

REFERENCES CITED

The following references are of record in the file of this patent:

UNITED STATES PATENTS

| Number | Name | Date |
|---|---|---|
| 2,036,084 | Roder | Mar. 31, 1936 |
| 2,143,658 | Morris et al. | Jan. 10, 1939 |
| 2,194,696 | Eickemeyer et al. | Mar. 26, 1940 |

FOREIGN PATENTS

| Number | Country | Date |
|---|---|---|
| 460,186 | Great Britain | Jan. 18, 1937 |